(12) United States Patent
Suzuki et al.

(10) Patent No.: US 7,928,328 B2
(45) Date of Patent: Apr. 19, 2011

(54) WEIGHING MACHINE

(75) Inventors: Shun Suzuki, Nakano-ku (JP); Teruichiro Ban, Itabashi-Ku (JP); Kosei Fukada, Nerima-ku (JP)

(73) Assignee: Tanita Corporation, Itabashi-Ku, Tokyo (JP)

( * ) Notice: Subject to any disclaimer, the term of this patent is extended or adjusted under 35 U.S.C. 154(b) by 304 days.

(21) Appl. No.: 12/330,848

(22) Filed: Dec. 9, 2008

(65) Prior Publication Data
US 2009/0166095 A1    Jul. 2, 2009

(30) Foreign Application Priority Data

Dec. 27, 2007   (JP) ................................. 2007-336446

(51) Int. Cl.
*G01G 23/32* (2006.01)
(52) U.S. Cl. ...................... 177/1; 177/25.13; 177/210 R; 307/152
(58) Field of Classification Search ............ 177/1, 25.13, 177/210 R; 307/152
See application file for complete search history.

(56) References Cited

U.S. PATENT DOCUMENTS

| | | | | |
|---|---|---|---|---|
| 4,156,472 A * | 5/1979 | Kunz | ........................... | 177/25.13 |
| 4,326,596 A | 4/1982 | Beck | | |
| 4,553,619 A * | 11/1985 | Fujinaga | ........................ | 177/185 |
| 4,696,359 A * | 9/1987 | Glibbery | ........................ | 177/211 |
| 4,763,739 A * | 8/1988 | Kasinoff | ..................... | 177/210 R |
| 5,172,783 A * | 12/1992 | Feinland et al. | ............... | 177/185 |
| 5,207,284 A | 5/1993 | Douglas et al. | | |
| 5,254,992 A * | 10/1993 | Keen et al. | ...................... | 341/119 |
| 6,177,637 B1 * | 1/2001 | Evans | ......................... | 177/25.13 |
| 6,373,237 B1 | 4/2002 | Oldendorf et al. | | |
| 6,689,960 B2 * | 2/2004 | Aoki | ........................... | 177/25.13 |
| 6,774,319 B2 * | 8/2004 | Aoki et al. | ..................... | 177/144 |

FOREIGN PATENT DOCUMENTS

DE    199 22 060 A1    11/1999

OTHER PUBLICATIONS

Search Report dated Apr. 24, 2009 in corresponding European Application No. 08021558.5.

* cited by examiner

*Primary Examiner* — Randy W Gibson
(74) *Attorney, Agent, or Firm* — Buchanan Ingersoll & Rooney PC

(57) ABSTRACT

A weighing machine having a weighing platform includes a detection unit for outputting a detection voltage depending on a load acting on the measuring platform; a first data generation unit for A-D converting the detection voltage to generate first data; a second data generation unit for A-D converting the detection voltage to generate second data; and a control unit which stops operating the second data generation unit and monitors the first data in a standby state, switches from the standby state to a measurement state when the control unit senses that an object is placed on the weighing platform, then stops operating the first data generation unit and operates the second data generation unit, and outputs the measured weight of the object according to the second data. The first data generation unit consumes less power but has a lower A-D conversion precision than the second data generation unit.

9 Claims, 8 Drawing Sheets

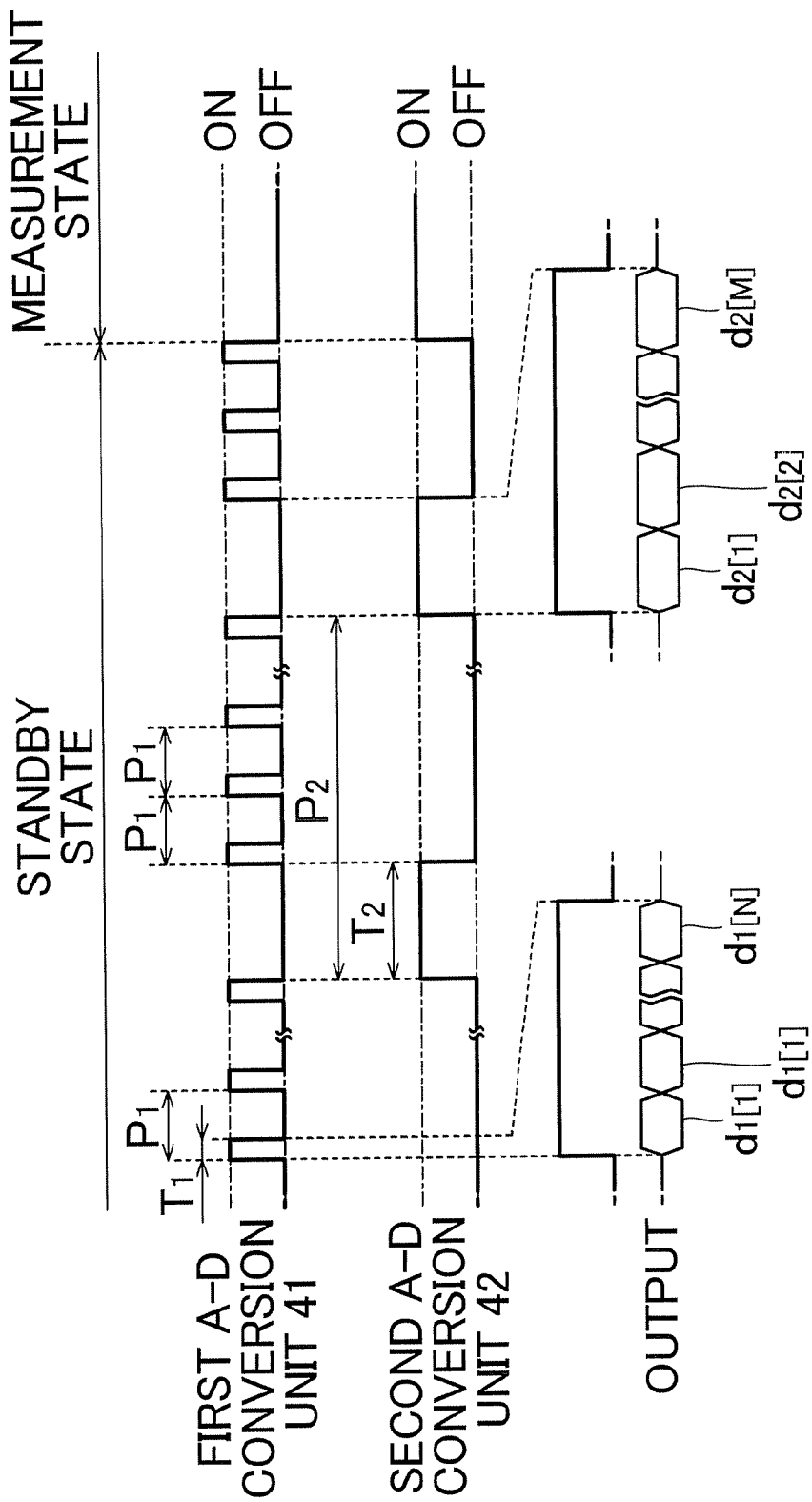

WEIGHING MACHINE

BACKGROUND OF THE INVENTION

1. Field of the Invention

The present invention relates to weighing machines that start weighing an object automatically.

2. Related Art

A known weighing machine starts weighing an object when it senses that the object is placed on its weighing platform. A weighing machine disclosed in U.S. Pat. No. 4,326,596, for example, starts weighing when it senses that a mechanical switch disposed under the weighing platform is turned on. This type of weighing machine saves the user from operating a power switch of the weighing machine and is convenient for use.

The mechanical switch, however, has a high possibility of becoming defective because of wear or the like through the repetition of the on-off operation, and could decrease the durability of the weighing machine. Another problem is that a built-in mechanical switch could increase the thickness of the weighing machine, degrading the stability. In addition, lower-power weighing machines with improved weighing precision are needed.

SUMMARY OF THE INVENTION

In view of the problems described above, it is an object of the present invention to provide a weighing machine with improved durability, stability, and weighing precision.

The present invention addresses the problems by providing a weighing machine having a weighing platform and capable of switching the operation state between a standby state in which it is sensed whether an object is placed on the weighing platform and a measurement state in which the object is weighed. The weighing machine includes a detection unit for outputting a detection voltage the magnitude of which depends on the weight of the object placed on the measuring platform; a first data generation unit for generating first data based on the result of A-D conversion of the detection voltage; a second data generation unit for generating second data based on the result of A-D conversion of the detection voltage; and a control unit which stops the operation of the second data generation unit and monitors the first data in the standby state, switches the operation state from the standby state to the measurement state when the control unit senses that the object is placed on the measuring platform, then stops the operation of the first data generation unit and operates the second data generation unit, and outputs the measured weight of the object on the basis of the second data. The first data generation unit consumes less power than the second data generation unit, and the second data generation unit has a higher A-D conversion precision than the first data generation unit.

In the present invention, the presence or absence of the object on the measuring platform is sensed on the basis of the first data generated from the result of A-D conversion of the detection voltage by the first data generation unit, so that a mechanical switch such as that described in U.S. Pat. No. 4,326,596 is unnecessary. Therefore, the durability, reliability, and stability of the weighing machine can be improved. In addition, whether an object is placed on the measuring platform is sensed in accordance with the first data generated by the first data generation unit, which consumes less power than the second data generation unit, and the measurement result is output in accordance with the second data generated by the second data generation unit, which has a higher A-D conversion precision than the first data generation unit. Therefore, the measurement precision is higher than in a structure in which both the sensing of the object on the measuring platform and the calculation of the measured weight are based just on the first data generated by the first data generation unit, and the power consumption is smaller than in a structure in which both the sensing of the object and the calculation of the measured weight are based just on the second data generated by the second data generation unit.

In a preferred mode of the present invention, the control unit intermittently operates the first data generation unit at intervals of a first period in the standby state, compares the first data obtained in each first time segment in which the first data generation unit operates, with first reference data, and senses that the object is placed on the measuring platform when the first data exceeds the first reference data. In this mode, since the first data generation unit operates intermittently, the power consumption can be reduced in comparison with a structure in which the first data generation unit operates continuously.

In a further preferred mode, the weighing machine further includes a storage unit for storing, as zero-point data, the second data while the object is not placed on the measuring platform. In the standby state, the control unit intermittently operates the second data generation unit at intervals of a second period which is longer than the first period, updates the contents of the storage unit by writing in the storage unit the second data obtained in each second time segment in which the second data generation unit operates, as the zero-point data, and, in the measurement state, reads the zero-point data from the storage unit, calculates the difference between the zero-point data and the second data, and outputs the calculated result as the measured weight of the object. In this mode, since the zero-point data is periodically updated in accordance with the second data generated by the second data generation unit, an accurate measurement value can be calculated by correcting a characteristic change with the passage of time of the detection unit, for instance.

In the weighing machine according to the present invention, accurate zero-point data can be obtained by setting the second time segment longer than the first period. When the operation of the first data generation unit stops in the second time segment, since the sensing of the object on the measuring platform and the generation and updating of the zero-point data are selectively executed (the sensing of the object and the generation of the zero-point data need not be executed in parallel), the structure and processing of the control unit are simplified. The same advantage can be obtained when the second time segment is shorter than the first period, and the control unit controls the operation of the first data generation unit and the second data generation unit in such a manner that the first time segment does not overlap the second time segment in the standby state.

In a preferred mode of the present invention, the control unit compares the second data with second reference data in the second time segment in the standby state, writes the second data as the zero-point data in the storage unit if the second data does not exceed the second reference data, or switches the operation state from the standby state to the measurement state if the second data exceeds the second reference data, and stops the operation of the first data generation unit and continues the operation of the second data generation unit. In this mode, since a transition from the standby state to the measurement state is made when the second data exceeds the second reference data, the object on the measuring platform can be sensed in the second time segment as well.

In a preferred mode of the present invention, the control unit monitors the second data in the measurement state. When the control unit senses that the object is removed from the measuring platform, the control unit switches the operation state from the measurement state to the standby state, stops the operation of the second data generation unit, and operates the first data generation unit. In this mode, since it is sensed from the second data that the object is removed from the measuring platform, the first data generation unit need not be operated in the measurement state.

In a preferred mode of the present invention, the first data generation unit includes a first A-D conversion unit for converting the detection voltage to digital data, and generates the first data by averaging out N pieces of digital data, N being a natural number not smaller than 2, generated by the first A-D conversion unit at different time points. The second data generation unit includes a second A-D conversion unit for converting the detection voltage to digital data, and generates the second data by averaging out M pieces of digital data, M being a natural number not smaller than 2, generated by the second A-D conversion unit at different time points. In this mode, if the first A-D conversion unit and the second A-D conversion unit have the same A-D conversion precision, the power consumption of the first data generation unit can be made smaller than that of the second data generation unit, and the A-D conversion precision of the second data generation unit can be made higher than that of the first data generation unit, by setting M, namely, the number of pieces of digital data used in the generation of the second data, to a value greater than N, namely, the number of pieces of digital data used in the generation of the first data.

BRIEF DESCRIPTION OF THE DRAWINGS

With reference to the accompanying drawings, various embodiments of the present invention will be described hereinafter. In the drawings:

FIG. 2 is a timing chart of the operation of the weighing machine.

DETAILED DESCRIPTION OF PREFERRED EMBODIMENTS

Embodiments of the present invention will be described below.

First Embodiment

Figure 1:
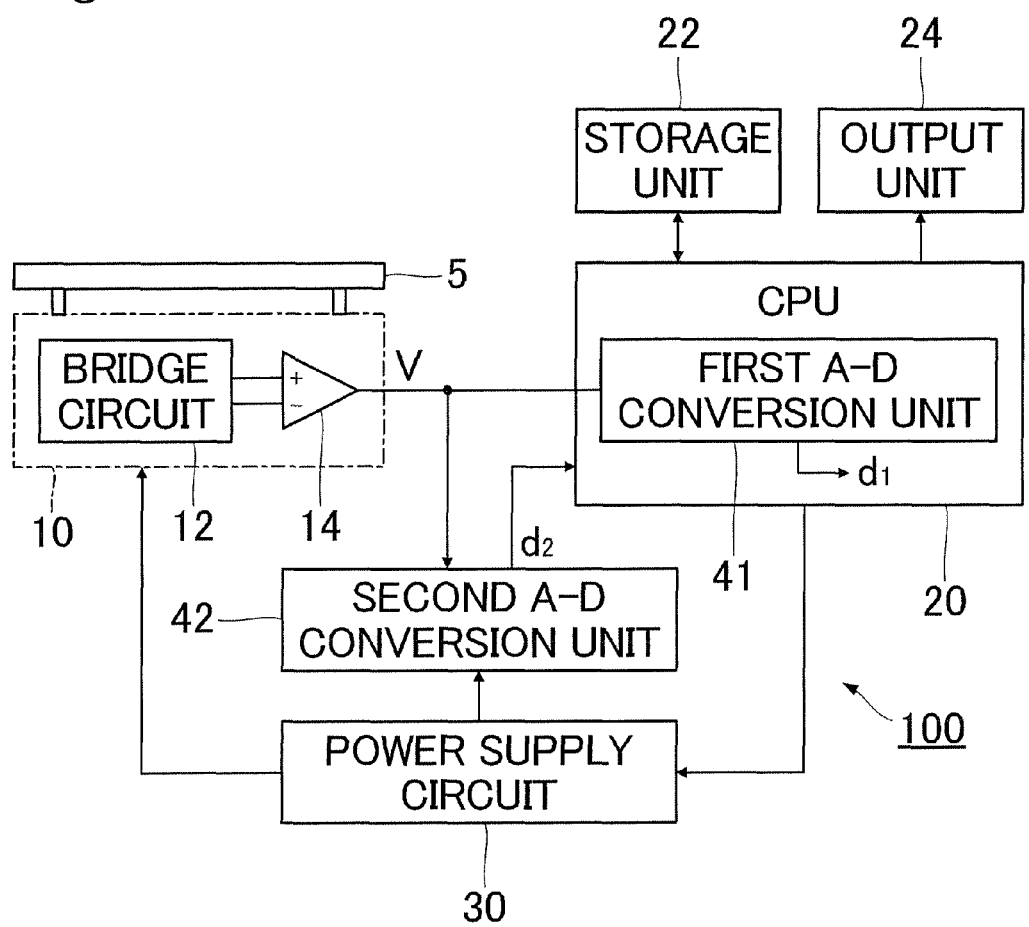
FIG. 1 is a block diagram of a weighing machine according to a first embodiment of the present invention.

FIG. 1 is a block diagram of a weighing machine 100 of a first embodiment of the present invention. The weighing machine 100 is an instrument for weighing an object placed on a weighing platform 5, such as a scale for measuring body weight. As shown in FIG. 1, the weighing machine 100 includes a detection unit 10, a central processing unit (CPU) 20, a storage unit 22, an output unit 24, a power supply circuit 30, and a second A-D conversion unit 42. A first A-D conversion unit 41 is included in the CPU 20. The first A-D conversion unit 41 may be provided as a component independent of the CPU 20.

The detection unit 10 generates a detection voltage V (analog signal) the magnitude of which depends on the weight of the object placed on the weighing platform 5. As shown in FIG. 1, the detection unit 10 in the first embodiment includes a bridge circuit 12 and a differential amplifier 14. The bridge circuit 12 includes a plurality of bridge resistors disposed between a higher power-supply voltage and a lower power-supply voltage, and outputs a voltage the magnitude of which depends on the load acting on the weighing platform 5. The differential amplifier 14 generates the detection voltage V by amplifying the output voltage of the bridge circuit 12.

The CPU 20 controls each part of the weighing machine 100 by executing a program. The storage unit 22 is a unit for storing the program to be executed by the CPU 20 and a variety of data used by the CPU 20, such as a nonvolatile memory. The output unit 24 outputs the measured weight of the object. For instance, the output unit 24 can be a display apparatus for displaying the measurement value as an image, a printing apparatus for printing the measurement value on paper, or a sound output apparatus for reading out the measurement value. The power supply circuit 30 supplies power to the detection unit 10 and the second A-D conversion unit 42 as instructed by the CPU 20.

The first A-D conversion unit 41 generates digital data d1 successively by performing A-D conversion of the detection voltage V output from the detection unit 10. The second A-D conversion unit 42 generates digital data d2 successively by performing A-D conversion of the detection voltage V output from the detection unit 10. The data d2 generated by the second A-D conversion unit 42 is sent to the CPU 20.

The first A-D conversion unit 41 and the second A-D conversion unit 42 have different A-D conversion precisions and consume different amounts of power. More specifically, the second A-D conversion unit 42 has a higher A-D conversion precision (resolution) than the first A-D conversion unit 41, and the first A-D conversion unit 41 consumes less power than the second A-D conversion unit 42. For example, a successive approximation A-D converter is used as the first A-D conversion unit 41, and a double-integral or quadruple-integral A-D converter is used as the second A-D conversion unit 42.

The weighing machine 100 has two operation states: standby state and measurement state. In the standby state, two processes are periodically executed: a process for judging whether an object is placed on the weighing platform 5 (step-on sensing process) and a process for specifying such a value of the detection voltage V that the measurement value becomes zero (zero adjustment process). When the object placed on the weighing platform 5 is sensed in the step-on sensing process in the standby state, the weighing machine 100 enters the measurement state. In the measurement state, the object on the weighing platform 5 is weighed with reference to the zero-point voltage specified in the zero adjustment process. When the measurement finishes (when the object is removed from the weighing platform 5), the weighing machine 100 returns to the standby state.

FIG. 2 is a timing chart of the operation of the weighing machine 100. The figure shows the timing at which the first A-D conversion unit 41 and the second A-D conversion unit 42 are turned on and off. As shown in FIG. 2, the CPU 20 intermittently operates the second A-D conversion unit 42 at intervals of a predetermined period $P_2$ (three seconds, for instance) in the standby state. The second A-D conversion unit 42 generates M pieces of data d2 (d2[1] to d2[M] in FIG. 2) by successively performing A-D conversion of the detection voltage V in a predetermined length of time segment $T_2$ (operation time) starting at intervals of period $P_2$. The CPU 20 executes the zero adjustment process in each operation time $T_2$, by using the M pieces of data d2 generated by the second A-D conversion unit 42.

In the standby state, the CPU 20 intermittently operates the first A-D conversion unit 41 at intervals of period $P_1$ (such as one second) which is shorter than the period $P_2$. The first A-D conversion unit 41 generates N pieces of data d1 (d1[1] to d1[N] in FIG. 2) by successively performing A-D conversion of the detection voltage V in a predetermined length of time segment $T_1$ (operation time) starting at intervals of period $P_1$. The CPU 20 stops the operation of the first A-D conversion unit 41 during the operation time $T_2$ of the second A-D conversion unit 42, as shown in FIG. 2. The CPU 20 executes the step-on sensing process in each operation time $T_1$ by using the N pieces of data d1 generated by the first A-D conversion unit 41.

In the measurement state, the CPU 20 stops the operation of the first A-D conversion unit 41 and starts the operation of the second A-D conversion unit 42. The second A-D conversion unit 42 generates data d2 successively by performing A-D conversion of the detection voltage V in the measurement state, as in the operation time $T_2$. The CPU 20 calculates the weight of the object, on the basis of the M pieces of data d2 (d2[1] to d2[M]) generated by the second A-D conversion unit 42 and outputs the result as a measurement value to the output unit 24.

Figure 3A:
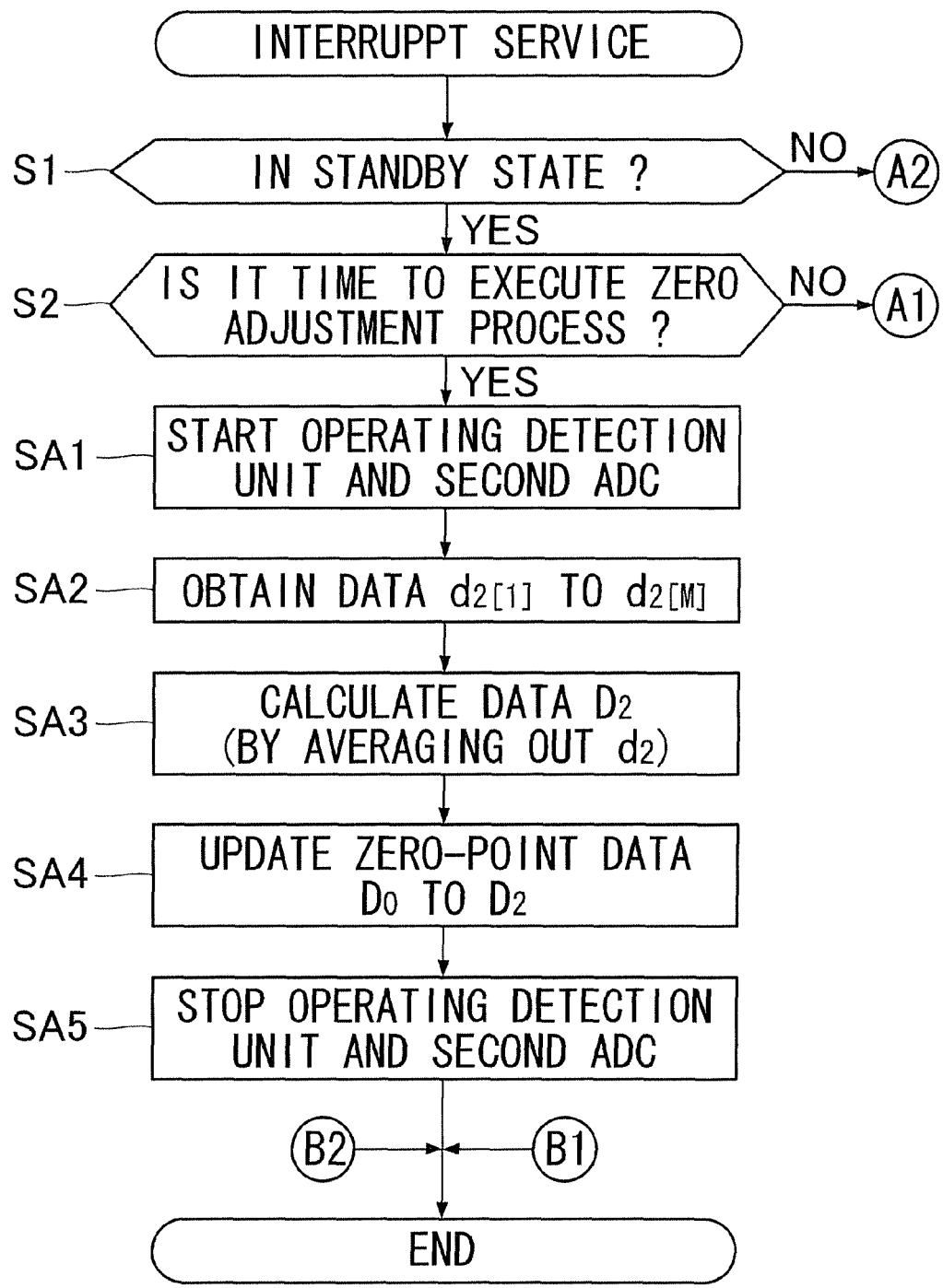
FIG. 3A and FIG. 3B form a flowchart illustrating operations (zero adjustment process and step-on sensing process) of the weighing machine.
Figure 3B:
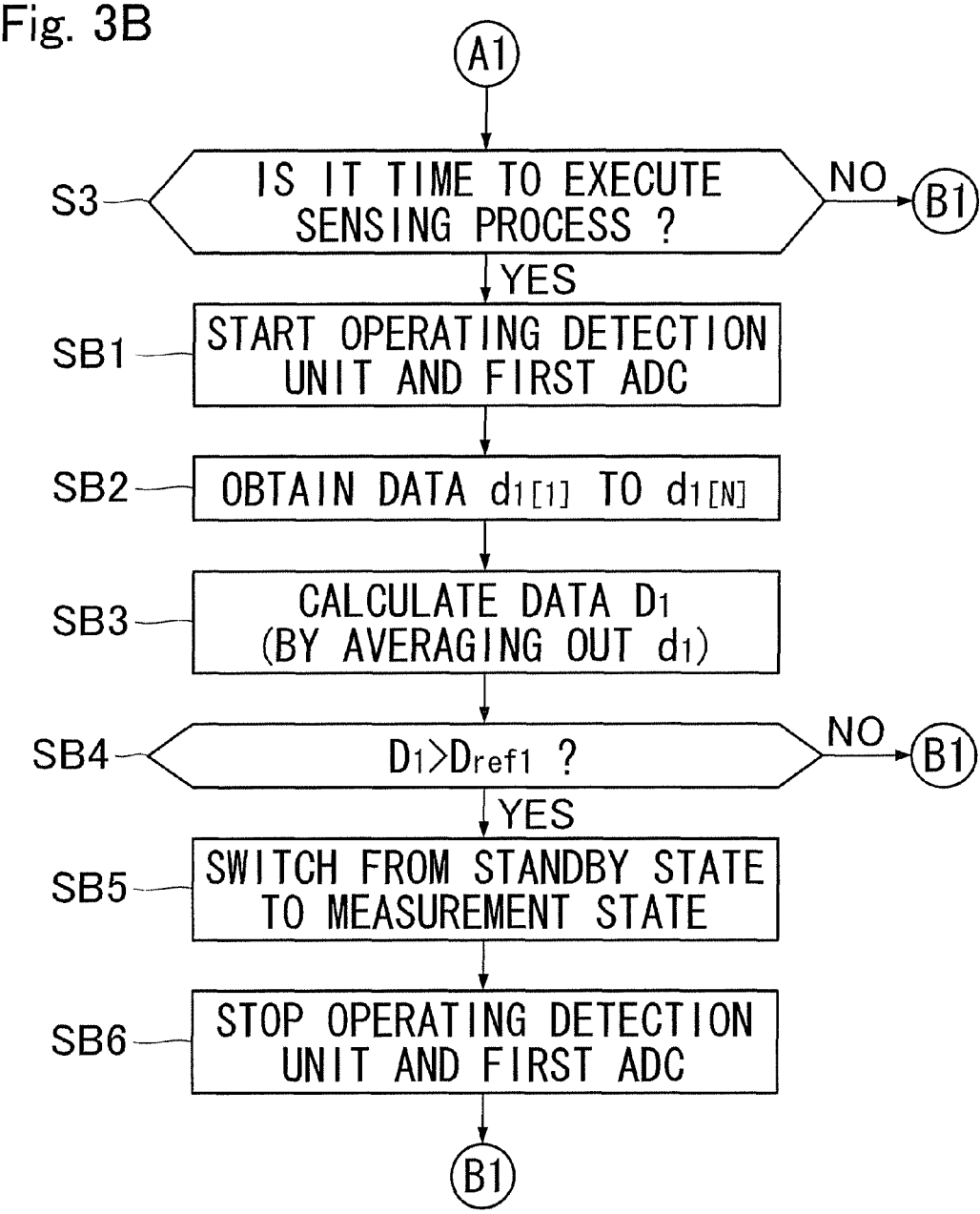

FIG. 3A and FIG. 3B form a flowchart showing specific operations of the CPU 20 (the program stored in the storage unit 22). The processing shown in FIG. 3A and FIG. 3B are handled as an interrupt service each time a timer interrupt is generated at intervals of a period sufficiently shorter than the period $P_1$.

The CPU 20 judges first whether the weighing machine 100 is in the standby state (step S1). If yes, the CPU 20 judges whether the time to execute the zero adjustment process (the start point of the operation time $T_2$) has been reached (step S2). If the judgment in step S2 is Yes, the CPU 20 executes the zero adjustment process (steps SA1 to SA5).

If the judgment in step S2 is No, the CPU 20 judges whether the time to execute the step-on sensing process (the start point of the operation time $T_1$) has been reached (step S3). If the judgment in step S3 is Yes, the CPU 20 executes the step-on sensing process (steps SB1 to SB6). If the judgment in step S3 is No, the CPU 20 finishes the interrupt service illustrated in FIG. 3A and FIG. 3B.

In the zero adjustment process, the CPU 20 operates the detection unit 10 and the second A-D conversion unit 42 by controlling the power supply circuit 30 to supply power to the detection unit 10 and the second A-D conversion unit 42 (step SA1). The detection unit 10 and the second A-D conversion unit 42 start operating with the supplied power. Then, the CPU 20 obtains the M pieces of data d2 (d2[1] to d2[M]) generated by the second A-D conversion unit 42 (step SA2). The CPU 20 generates data $D_2$ by averaging out the M pieces of data d2 (step SA3). The data $D_2$ represents a numeric value corresponding to the magnitude of the load acting on the weighing platform 5.

The storage unit 22 stores data $D_0$ (zero-point data) representing the value of the detection voltage V while no object (no load) is placed on the weighing platform 5. The CPU 20 updates the contents of the storage unit 22 (past zero-point data $D_0$) by storing the data $D_2$ calculated in step SA3 as new zero-point data $D_0$ in the storage unit 22 (step SA4). The CPU 20 stops supplying power from the power supply circuit 30 to stop the detection unit 10 and the second A-D conversion unit 42 (step SA5) and terminates the interrupt service illustrated in FIG. 3A and FIG. 3B.

In the step-on sensing process started when the judgment in step S3 is Yes, the CPU 20 controls the power supply circuit 30 to supply power to the detection unit 10 and operates the first A-D conversion unit 41 (step SB1). The CPU 20 then obtains the N pieces of data d1 (d1[1] to d1[N]) generated by the first A-D conversion unit 41 (step SB2) and generates data $D_1$ by averaging out the N pieces of data d1 (step SB3).

The CPU 20 compares the data $D_1$ calculated in step SB3 with predetermined reference data $D_{ref1}$ and judges whether the data $D_1$ exceeds the reference data $D_{ref1}$ (step SB4). The reference data $D_{ref1}$ is stored in the storage unit 22 after it is statistically or experimentally specified to fall below an expected minimum value of the weight of the object to be weighed by the weighing machine 100. While no object is placed on the weighing platform 5, the data $D_1$ falls below the reference data $D_{ref1}$. When an object is placed on the weighing platform 5, the data $D_1$ exceeds the reference data $D_{ref1}$. Step SB4 corresponds to a process for judging whether an object is placed on the weighing platform 5.

If the judgment in step SB4 is Yes (it is judged that an object is placed on the weighing platform 5), the CPU 20 switches the weighing machine 100 from the standby state to the measurement state (step SB5). The CPU 20 stops the operation of the detection unit 10 and the first A-D conversion unit 41 (step SB6) and terminates the interrupt service illustrated in FIG. 3A and FIG. 3B. If the judgment in step SB4 is No, the CPU 20 skips steps SB5 and SB6 and ends the interrupt service, maintaining the standby state.

Figure 4:
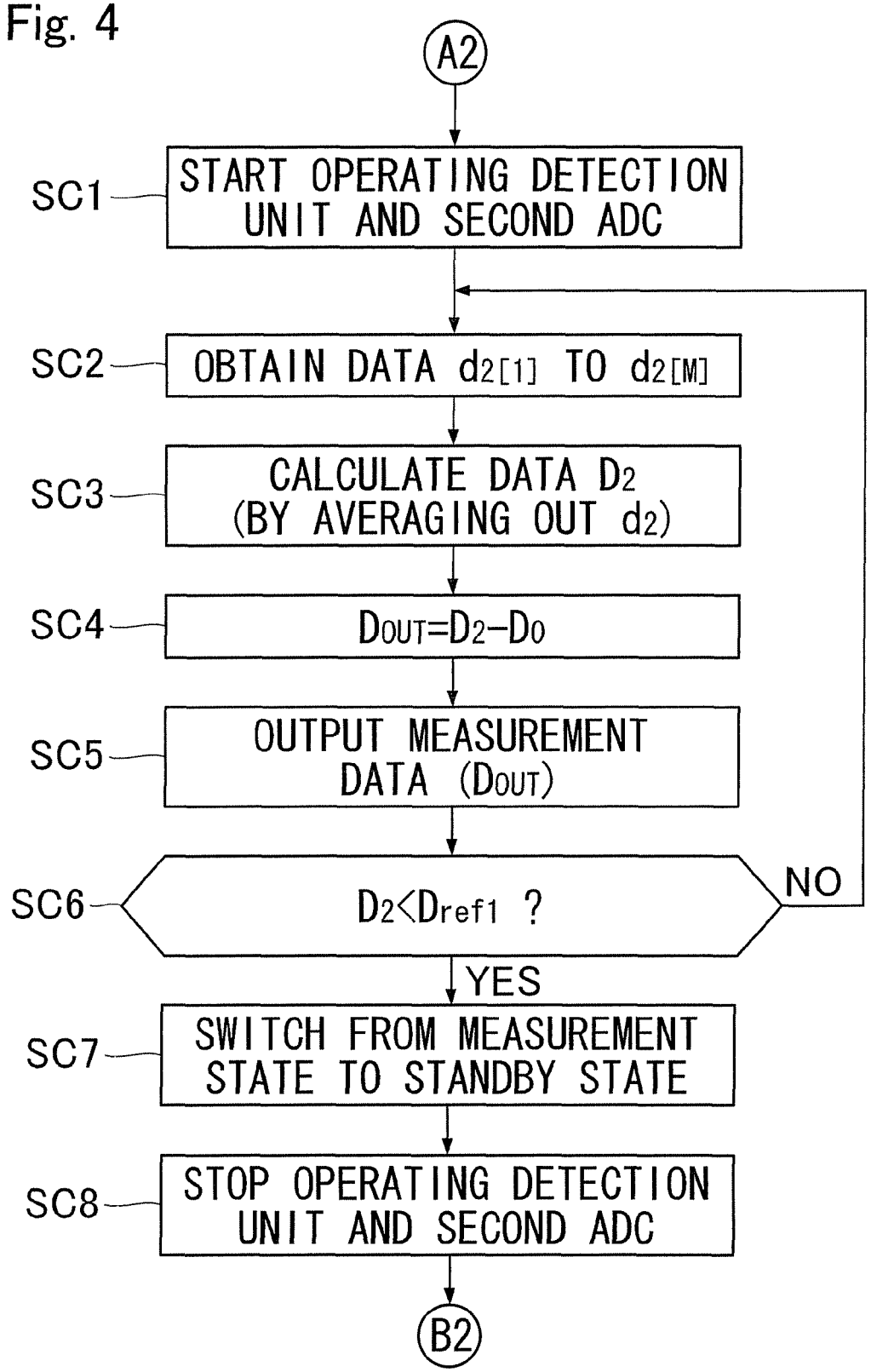
FIG. 4 is a flowchart illustrating an operation (measurement process) of the weighing machine.

When the interrupt service illustrated in FIG. 3A and FIG. 3B starts with the measurement state specified in step SB5, the judgment in step S1 is No, and a measurement process (steps SC1 to SC8) illustrated in FIG. 4 starts. In the measurement process, the CPU 20 operates the detection unit 10 and the second A-D conversion unit 42 by controlling the power supply circuit 30 to supply power to the detection unit 10 and the second A-D conversion unit 42 (step SC1). The detection unit 10 and the second A-D conversion unit 42 start operating with the supplied power. The CPU 20 obtains the M pieces of data d2 (d2[1] to d2[M]) generated by the second A-D conversion unit 42 (step SC2) and generates data $D_2$ by averaging out the M pieces of data d2 (step SC3).

The CPU 20 calculates measurement data $D_{OUT}$ by subtracting the zero-point data $D_0$ stored in the storage unit 22 (zero-point data $D_0$ updated in the immediately-preceding zero adjustment process) from the data $D_2$ calculated in step SC3 (step SC4). The CPU 20 outputs the measurement data $D_{OUT}$ to the output unit 24 as the measured weight of the object (step SC5). In step SA2 (of the zero adjustment process) and step SC2 (of the measurement process), the data $D_2$ may be calculated from different numbers of pieces of data d2.

The CPU 20 judges whether the data $D_2$ calculated in step SC3 (or measurement data $D_{OUT}$) falls below the reference data $D_{ref1}$ (step SC6). If the judgment in step SC6 is Yes, it can be judged that the object has been removed from the weighing platform 5. Accordingly, the CPU 20 switches the weighing machine 100 from the measurement state to the standby state (step SC7). The CPU 20 then stops supplying power from the power supply circuit 30 to stop the operation of the detection unit 10 and the second A-D conversion unit 42 (step SC8), and ends the interrupt service. If the judgment in step SC6 is No (an object is placed on the weighing platform 5), the CPU 20 repeatedly outputs the measurement value corresponding to the latest M pieces of data d2 output successively from the second A-D conversion unit 42 (steps SC2 to SC5).

As has been described above, in this embodiment, the presence or absence of an object is judged from the data d1 ($D_1$) generated from the detection voltage V by the first A-D conversion unit 41, eliminating the need for a mechanical switch for sensing the object. Therefore, in comparison with the related art described in U.S. Pat. No. 4,326,596, the weighing machine 100 has higher durability and higher reliability. Because the mechanical switch becomes unnecessary, the thickness of the weighing machine 100 can be reduced accordingly, and the stability of the weighing machine 100 can be improved. Since the single detection unit 10 is used to generate both the data d1 in the first A-D conversion unit 41 and the data d2 in the second A-D conversion unit 42, the structure of the weighing machine 100 is simple in comparison with a weighing machine having different detection units for the detection voltages input to the first A-D conversion unit 41 and the second A-D conversion unit 42.

The first A-D conversion unit 41, which generates N pieces of data d1, and the CPU 20, which generates data $D_1$ from the N pieces of data d1 (steps SB2 and SB3), form a first data generation unit for generating data $D_1$ (first data) from the detection voltage. The second A-D conversion unit 42, which generates M pieces of data d2, and the CPU 20, which generates data $D_2$ from the M pieces of data d2 (steps SA2 and SA3 or steps SC2 and SC3), form a second data generation unit for generating data $D_2$ (second data) from the detection voltage V. The first data generation unit consumes less power than the second data generation unit, and the second data generation unit has a higher A-D conversion precision than the first data generation unit.

Since the first data generation unit, which consumes less power than the second data generation unit, is used in the step-on sensing process, the power consumption of the weighing machine 100 can be reduced in comparison with a structure in which the step-on sensing process is executed on the basis of the data $D_2$ generated by the second data generation unit, for instance. Since the second data generation unit, which has a higher A-D conversion precision than the first data generation unit, is used in the measurement process, the measurement precision can be improved in comparison with a structure in which the measurement process is executed on the basis of the data $D_1$ generated by the first data generation unit, for instance. In this embodiment, power needed for the step-on sensing process can be reduced, and high-precision measurement can be performed in the measurement process.

Second Embodiment

A second embodiment of the present invention will be described next. Elements having the same operation or function as elements in the first embodiment will be given identical reference symbols, and a description of those elements will be omitted.

Figure 5:
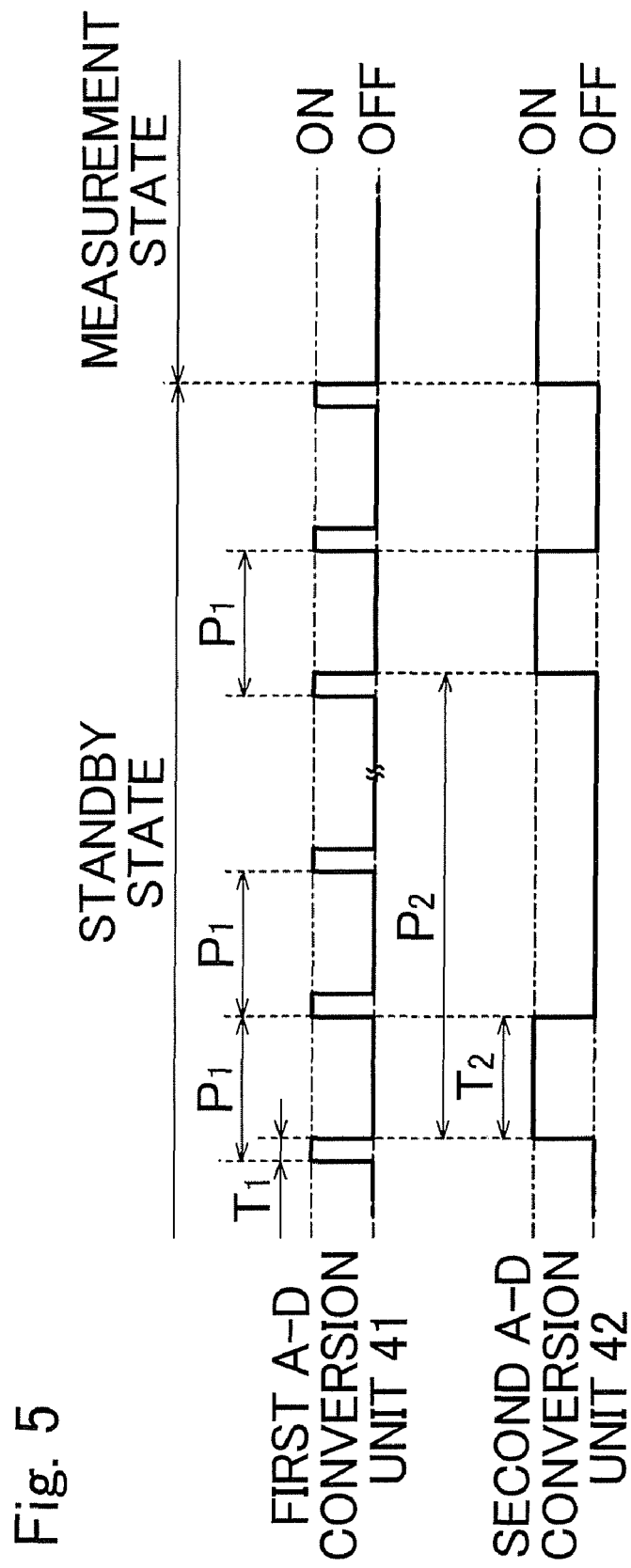
FIG. 5 is a timing chart of the operation of a weighing machine according to a second embodiment of the present invention.

FIG. 5 is a timing chart of the operation of a weighing machine 100 of a second embodiment of the present invention. As the figure shows, the length of the operation time $T_2$ of the second A-D conversion unit 42 in the standby state is shorter than the period $P_1$ (period of the step-on sensing process) in which the first A-D conversion unit 41 operates in the standby state.

The CPU 20 controls the operation of the first A-D conversion unit 41 and the second A-D conversion unit 42 in such a manner that the operation time $T_1$ of the first A-D conversion unit 41 does not overlap the operation time $T_2$ of the second A-D conversion unit 42. More specifically, the operation time $T_2$ is placed in a period between the end point of an operation time $T_1$ and the start point of the next operation time $T_1$. As in the first embodiment, the second A-D conversion unit 42 stops in the operation time $T_1$ of the first A-D conversion unit 41, and the first A-D conversion unit 41 stops in the operation time $T_2$ of the second A-D conversion unit 42. The operation of the CPU 20 in the standby state and the measurement state is the same as that in the first embodiment (FIGS. 3A, 3B, and 4).

In this embodiment, since the length of the operation time $T_2$ of the second A-D conversion unit 42 is shorter than the operation period $P_1$ of the first A-D conversion unit 41, the first A-D conversion unit 41 and the second A-D conversion unit 42 can be operated in a non-overlapping manner even if the first A-D conversion unit 41 keeps operating in the standby state at intervals of period $P_1$. Unlike the first embodiment, this eliminates the need for an action to stop the operation of the first A-D conversion unit 41 in the operation time $T_2$ of the second A-D conversion unit 42, reducing the processing load of the CPU 20.

Third Embodiment

Figure 6:
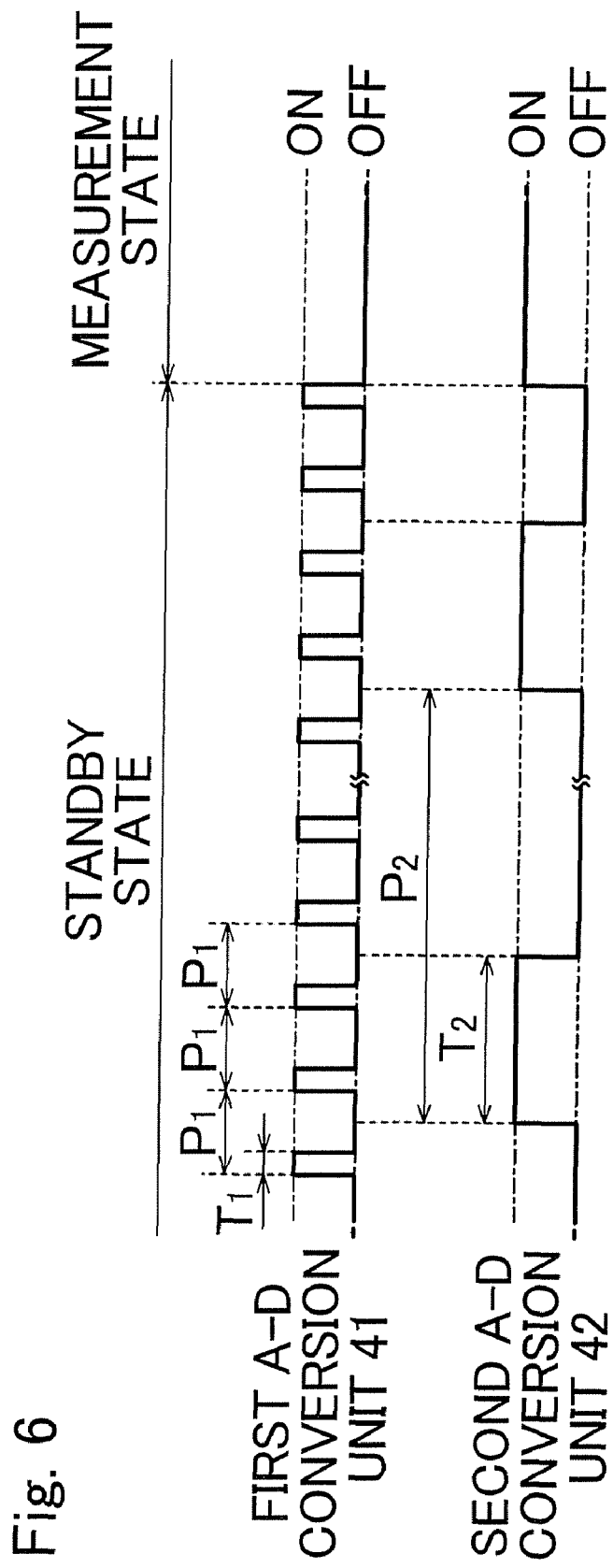
FIG. 6 is a timing chart of the operation of a weighing machine according to a third embodiment of the present invention.

FIG. 6 is a timing chart of the operation of a weighing machine 100 of a third embodiment of the present invention. As the figure shows, in the standby state, the CPU 20 intermittently operates the first A-D conversion unit 41 at intervals of period $P_1$ and intermittently operates the second A-D conversion unit 42 at intervals of period $P_2$, the period $P_2$ being longer than the period $P_1$. The operation time $T_2$ of the second A-D conversion unit 42 is longer than the period $P_1$, and the period $P_1$ of the operation time $T_1$ is constant both within and outside the operation time $T_2$. Therefore, in the standby state, one or more of the operation times $T_1$ of the first A-D conversion unit 41 overlap the operation time $T_2$ of the second A-D conversion unit 42.

The operation of the CPU 20 in the operation time $T_1$ not overlapping the operation time $T_2$ or in the measurement state is the same as that in the first embodiment. In the standby state, if the operation time $T_1$ starts within the operation time $T_2$ of the second A-D conversion unit 42, the CPU 20 executes the zero adjustment process (steps SA1 to SA5) and the step-on sensing process (steps SB1 to SB6), shown in FIG. 3A and FIG. 3B, in parallel.

If an object is placed on the weighing platform 5 during or immediately before the zero adjustment process, the weight of the object may have an influence on the data d2 to be generated by the second A-D conversion unit 42. In that case, the zero-point data $D_0$ generated from the data d2 does not represent the value of the detection voltage V under no load, and the measured weight obtained in the measurement process becomes an inaccurate value smaller than the correct weight of the object. In this embodiment, if the presence of an object is sensed in the step-on sensing process in the operation time $T_1$ within the operation time $T_2$ (Yes in step SB4), the CPU 20 discards the zero-point data $D_0$ calculated in the zero adjustment process without influencing the contents of the storage unit 22. In the measurement process after the object is sensed, the measurement data $D_{OUT}$ is calculated on the basis of the zero-point data $D_0$ specified in the preceding zero adjustment process.

In this embodiment, if it is doubtful whether the zero-point data $D_0$ represents the value of the detection voltage V under no load, the zero-point data $D_0$ is not used in the measurement process, so that the measurement value can be calculated accurately. Since the period $P_1$ of the operation time $T_1$ is constant both within and outside the operation time $T_2$, like the second embodiment, this embodiment does not require an action to stop the operation of the first A-D conversion unit 41 in the operation time $T_2$.

In the second embodiment, the period $P_1$ of the step-on sensing process must be longer than the operation time $T_2$ of the second A-D conversion unit 42. In this embodiment, however, the period $P_1$ can be specified irrespective of the operation time $T_2$. For instance, by setting the period $P_1$ to a sufficiently short period, transition to the measurement state can be made quickly after it is sensed that an object is placed on the weighing platform 5.

MODIFICATIONS

A variety of modifications can be made to the embodiments described above. Some of the modifications will be described below. The following modifications can be combined as appropriate.

First Modification

In the first or second embodiment, if an object is placed on the weighing platform 5 during or immediately before the zero adjustment process, the weight of the object sometimes affects the data d2 generated by the second A-D conversion unit 42, making the measurement value inaccurate, as described in the third embodiment. To prevent this problem, the CPU 20 may sense the presence or absence of an object on the weighing platform 5 in the zero adjustment process. For instance, as shown in FIG. 7, it is preferred that the data d2 generated by the second A-D conversion unit 42 for the zero adjustment process be used also for sensing the object.

Figure 7:
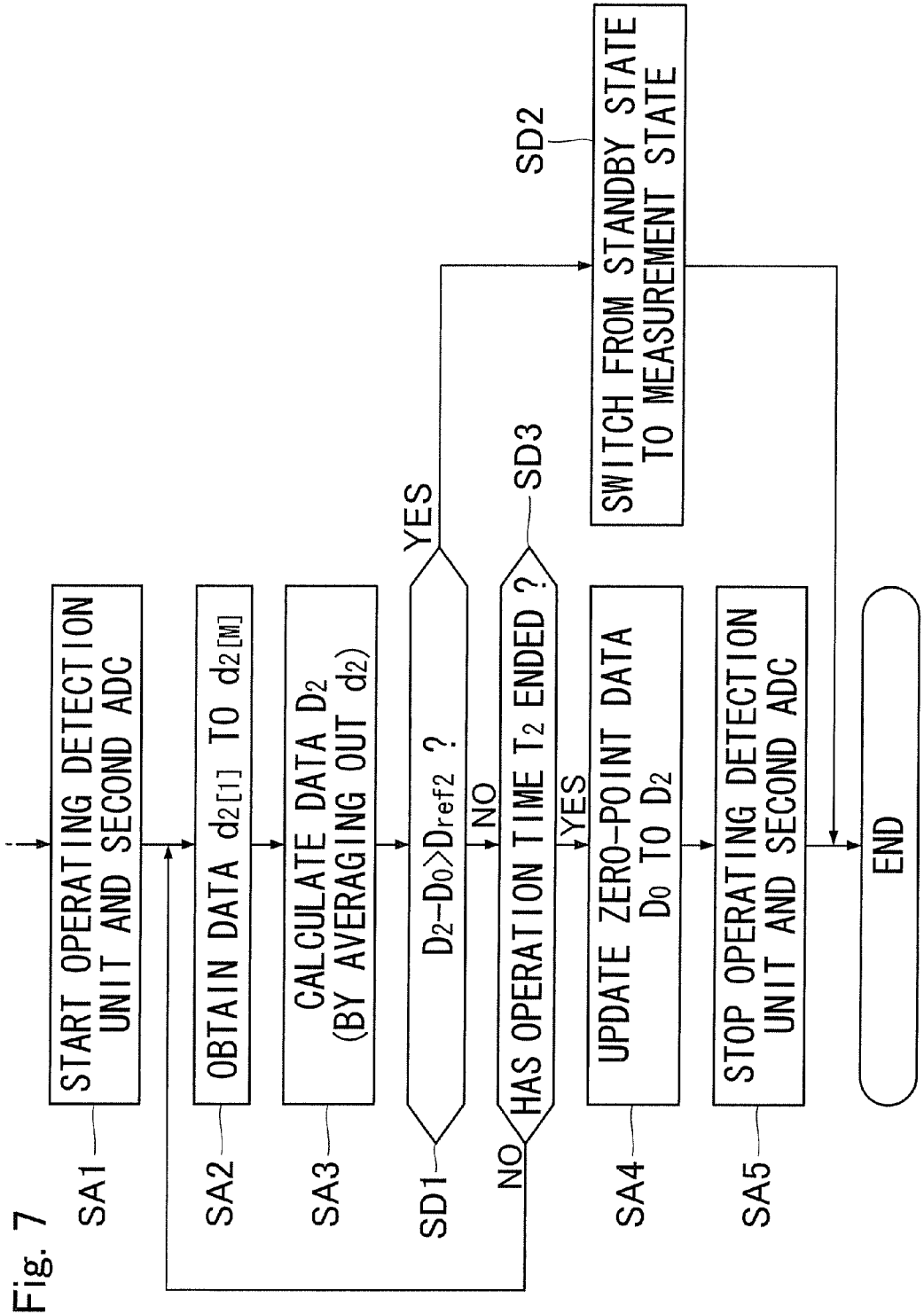
FIG. 7 is a flowchart illustrating the operation of a weighing machine of a modification.

In FIG. 7, step SD1 is executed after step SA3, which was described with reference to FIG. 3A and FIG. 3B. In step SD1, the CPU 20 judges whether the difference between the data $D_2$ calculated in step SA3 and the zero-point data $D_0$ stored in the storage unit 22 (zero-point data $D_0$ specified in a past zero adjustment process) exceeds a predetermined reference value $D_{ref2}$. The reference value $D_{ref2}$ is statistically or experimentally specified to exceed the expected maximum value of the detection voltage V under no load and to fall below the expected minimum value of the weight of the object to be weighed by the weighing machine 100, and is stored in the storage unit 22. Therefore, if no object is placed on the weighing platform 5, the data $D_2$ falls below the reference data $D_{ref2}$, and if an object is placed on the weighing platform 5, the data $D_2$ exceeds the reference data $D_{ref2}$. In other words, step SD1 corresponds to a process for judging whether an object is on the weighing platform 5.

If the judgment in step SD1 is Yes (if it is judged that an object is placed on the weighing platform 5), the CPU 20 makes a transition from the standby state to the measurement state (step SD2) and finishes the interrupt service, continuing the operation of the detection unit 10 and the second A-D conversion unit 42. Therefore, the data $D_2$ calculated in the current zero adjustment process (steps SA2 and SA3) is not reflected in the zero-point data $D_0$ in the storage unit 22 (the zero-point data $D_0$ is not updated).

The second A-D conversion unit 42 continues to output the data d2 in the operation time $T_2$. If the judgment in step SD1 is No, the CPU 20 judges whether the operation time $T_2$ has ended (step SD3). If the operation time $T_2$ has not ended, the CPU 20 repeats the generation of the data $D_2$ from the latest M pieces of data d2 sent from the second A-D conversion unit 42 (steps SA2 and SA3) and the comparison with the reference data $D_{ref2}$ (step SD1). If the operation time $T_2$ ends (Yes in step SD3) when the difference between any of the data $D_2$ and the zero-point data $D_0$ in the operation time $T_2$ does not exceed the reference data $D_{ref2}$, the CPU 20 updates the contents of the storage unit 22 by storing the data $D_2$ calculated in the immediately preceding step SA3 as new zero-point data $D_0$ in the storage unit 22 (step SA4). Then, the CPU 20 stops the detection unit 10 and the second A-D conversion unit 42 (step SA5) and finishes the interrupt service.

In this modification, since the presence or absence of an object on the weighing platform 5 is judged on the basis of the data d2 in the zero adjustment process in the operation time $T_2$, as well as the data d1 in the step-on sensing process in the operation time $T_1$, even if the object is placed on the weighing platform 5 during or immediately before the operation time $T_2$, the zero-point data $D_0$ will not be set to an inaccurate value. Therefore, the measured weight of the object can be accurately identified. The operation illustrated in FIG. 7 can be applied to both the first embodiment and the second embodiment. In step SD1 shown in FIG. 7, the difference between the data $D_2$ and the zero-point data $D_0$ is compared with the reference data $D_{reg2}$. In that step, it may be judged whether the data $D_2$ exceeds the reference data $D_{ref2}$.

Second Modification

In the embodiments described above, the data $D_1$ is obtained by averaging out the N pieces of data d1. Instead of averaging, a single piece of digital data obtained through A-D conversion of the detection voltage V in the first A-D conversion unit 41 may be used as the data $D_1$. A single piece of digital data obtained through A-D conversion of the detection voltage V in the second A-D conversion unit 42 may also be used as the data $D_2$. Instead of the first A-D conversion unit 41, a comparator for comparing the reference voltage $V_{ref}$ represented by the reference data $D_{ref1}$ with the detection voltage V may also be used. The comparator outputs a signal of a first value if the detection voltage V exceeds the reference voltage $V_{ref}$ or outputs a signal of a second value if the detection voltage V falls below the reference voltage $V_{ref}$. In the step-on sensing process, if the comparator outputs the signal of the first value, the CPU 20 judges that an object is placed on the weighing platform 5, and if the signal of the second value is output, the CPU judges that the object is not on the weighing platform 5. The operation of the comparator described here is a process for outputting a binary signal depending on the detection voltage V and is included in the concept of A-D conversion in the present invention.

Third Modification

The zero adjustment process can be omitted as appropriate in the embodiments described above. For example, step S3 may be executed if the judgment in step S1 shown in FIG. 3A is Yes.

What is claimed is:

1. A weighing machine having a weighing platform and capable of switching the operation state thereof between a standby state in which it is sensed whether an object is placed on the weighing platform and a measurement state in which the object is weighed, the weighing machine comprising:

a detection unit for outputting a detection voltage depending on a load acting on the measuring platform;

a first data generation unit for generating first data based on the result of A-D conversion of the detection voltage;

a second data generation unit for generating second data based on the result of A-D conversion of the detection voltage; and a control unit which stops the operation of the second data generation unit and monitors the first data in the standby state, switches the operation state from the standby state to the measurement state when the control unit senses that the object is placed on the weighing platform, then stops the operation of the first data generation unit and operates the second data generation unit, and outputs the measured weight of the object on the basis of the second data;

wherein the first data generation unit consumes less power than the second data generation unit, and the second data generation unit has a higher A-D conversion precision than the first data generation unit.

2. The weighing machine according to claim 1, wherein the control unit intermittently operates the first data generation unit at intervals of a first period in the standby state, compares the first data obtained in each first time segment in which the first data generation unit operates, with first reference data, and senses that the object is placed on the weighing platform when the first data exceeds the first reference data.

3. The weighing machine according to claim 2, further comprising a storage unit for storing, as zero-point data, the second data while the object is not placed on the weighing platform;

wherein, in the standby state, the control unit intermittently operates the second data generation unit at intervals of a second period which is longer than the first period and updates the contents of the storage unit by writing in the storage unit the second data obtained in each second time segment in which the second data generation unit operates, as the zero-point data; and in the measurement state, the control unit reads the zero-point data from the storage unit, calculates the difference between the zero-point data and the second data, and outputs the result as the measured weight of the object.

4. The weighing machine according to claim 3, wherein the second time segment is longer than the first period.

5. The weighing machine according to claim 3, wherein the second time segment is shorter than the first period; and the control unit controls the operation of the first data generation unit and the second data generation unit in the standby state such that the first time segment does not overlap with the second time segment.

6. The weighing machine according to claim 3, wherein the control unit stops the operation of the first data generation unit in the second time segment.

7. The weighing machine according to claim 3, wherein the control unit compares the second data with second reference data in the second time segment in the standby state, writes the second data as the zero-point data in the storage unit if the second data does not exceed the second reference data, or switches the operation state from the standby state to the measurement state if the second data exceeds the second reference data, and stops the operation of the first data generation unit while continuing the operation of the second data generation unit.

8. The weighing machine according to claim 1, wherein the control unit monitors the second data in the measurement state, and, when the control unit senses that the object is removed from the weighing platform, switches the operation state from the measurement state to the standby state, stops the operation of the second data generation unit, and operates the first data generation unit.

9. The weighing machine according to claim 1, wherein the first data generation unit comprises a first A-D conversion unit for converting the detection voltage to digital data, and generates the first data by averaging out N pieces of digital data, N being a natural number not smaller than 2, generated from the detection voltage by the first A-D conversion unit at different time points; and the second data generation unit comprises a second A-D conversion unit for converting the detection voltage to digital data, and generates the second data by averaging out M pieces of digital data, M being a natural number not smaller than 2, generated from the detection voltage by the second A-D conversion unit at different time points.

* * * * *